United States Patent
Chen et al.

(10) Patent No.: US 10,176,150 B2
(45) Date of Patent: Jan. 8, 2019

(54) REMOTELY PROVIDING FONTS FOR AN ELECTRONIC DOCUMENT

(71) Applicant: International Business Machines Corporation, Armonk, NY (US)

(72) Inventors: Hsiao-Yung Chen, New Taipei (TW); Chao Yuan Huang, Taipei (TW); Yin Qian, Shanghai (CN); Yu-Hsing Wu, Taipei (TW); Wen Ke Xue, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/830,882

(22) Filed: Aug. 20, 2015

(65) Prior Publication Data

US 2016/0062957 A1 Mar. 3, 2016

(30) Foreign Application Priority Data

Aug. 29, 2014 (TW) .............................. 103130003 A

(51) Int. Cl.
*G06F 17/00* (2006.01)
*G06F 17/21* (2006.01)
*G06F 17/22* (2006.01)

(52) U.S. Cl.
CPC ........ *G06F 17/214* (2013.01); *G06F 17/2217* (2013.01); *G06F 17/2264* (2013.01); *G06F 17/2247* (2013.01)

(58) Field of Classification Search
CPC .................... G06F 17/214; G06F 17/2217
See application file for complete search history.

(56) References Cited

U.S. PATENT DOCUMENTS 6,623,529 B1   9/2003   Lakritz
7,155,672 B1   12/2006  Adler et al.
(Continued)

FOREIGN PATENT DOCUMENTS

EP   2354963 A3    4/2013
JP   2009009561 A  1/2009
(Continued)

OTHER PUBLICATIONS

Li, "A Dynamic Web Fonts Solution for Rendering Chinese Characters in Webpage", Run Run Shaw Library, City University of Hong Kong, CityU Institutional Repository. 2013. dspace.cityu.edu.hk/handle/2031/7090 1 page. Last printed Apr. 27, 2015 3:05 PM. © 2013 CityU Library. 1 page.

(Continued)

*Primary Examiner* — Scott T Baderman
*Assistant Examiner* — Barbara M Level
(74) *Attorney, Agent, or Firm* — Jared C. Chaney

(57) ABSTRACT

A computer-implemented method for remotely providing fonts for an electronic document comprises receiving a request to access an electronic document from a user terminal; locating an original version of the electronic document; selecting a code point encoding scheme from a plurality of code point encoding schemes based on a parameter in the request to access the electronic document; converting the original version of the electronic document to a second version of the electronic document based on the selected code point encoding scheme; and providing the second version of the electronic document to the user terminal.

20 Claims, 4 Drawing Sheets

(56) References Cited

U.S. PATENT DOCUMENTS

| | | |
|---|---|---|
| 8,161,382 B2 | 4/2012 | Joung et al. |
| 8,683,006 B2 | 3/2014 | Veen et al. |
| 2003/0028801 A1 | 2/2003 | Liberman et al. |
| 2007/0006076 A1 | 1/2007 | Cheng |
| 2007/0033637 A1* | 2/2007 | Yami ............... H04L 63/0428 726/2 |
| 2010/0218086 A1 | 8/2010 | Howell et al. |
| 2011/0090230 A1* | 4/2011 | Bacus ................. G06F 17/214 345/467 |
| 2011/0191671 A1 | 8/2011 | Hammond et al. |
| 2011/0258535 A1 | 10/2011 | Adler, III et al. |
| 2012/0260108 A1* | 10/2012 | Lee ..................... G06F 21/6218 713/191 |

FOREIGN PATENT DOCUMENTS

| | | |
|---|---|---|
| TW | 200828918 A | 7/2008 |
| TW | 201142628 A | 12/2011 |
| TW | 201203100 A | 1/2012 |

OTHER PUBLICATIONS

TW Application 103130003, entitled "Computer-Implemented Method for Remotely Providing Fonts for an Electronic Document", filed Aug. 29, 2014. 25 pages.

Unknown, "Web Design Software", Multimedia Australia Pty. Ltd., http://www.mmau.com/technology/index.php 2 pages. Last printed Apr. 27, 2015 3:03 PM. Copyright © 2001-2015 Multimedia Australia Pty. Ltd. Australian Company No. 096 830 394. 2 pages.

Unknown, "The Complete Web Fonts Solution", Fonts.com. http://www.fonts.com/web-fonts 5 pages. Last printed Apr. 27, 2015 2:52 PM. 5 pages.

Unknown, "Google Fonts", http://www.google.com/fonts 1 page. Last printed Apr. 27, 2015 2:53 PM. 1 page.

* cited by examiner

REMOTELY PROVIDING FONTS FOR AN ELECTRONIC DOCUMENT

BACKGROUND

The present disclosure generally relates to remotely providing fonts for an electronic document, and more particularly, to dynamically providing fonts for an electronic document, such as fonts in a webpage, and achieving effects of encryption and copy protection for the webpage content.

In order to accurately display characters in an electronic document (such as a webpage), the user terminal typically has suitable font files. For example, if the electronic document has Asian characters and the user terminal only has Latin font files, the Asian characters may not be accurately displayed. To solve the above issue, for instance, Cascading Style Sheets (CSS) level 2 specification has provided a scheme of remotely downloading required font files when loading webpages, and webpage characters may thereby be accurately displayed according to the design by the webpage designer, even if the user terminal originally does not have suitable font files.

SUMMARY

In one aspect, a computer-implemented method for remotely providing fonts for an electronic document is provided. As well known to those skilled in the art, a font comprises code point encoding information and glyph information. In view of this, a feature of the present disclosure is that all or a specific part of the content of the electronic document (such as a webpage) is encoded using code point encoding schemes unknown to the user terminal so as to achieve effects similar to encryption. When an authorized user accesses the electronic document, the authorized user may be directed to remotely acquire fonts based on the corresponding code point encoding scheme as decryption means to display the electronic document. Particularly, the code point encoding scheme of the electronic document may change with different users or dynamically change with other conditions.

On the contrary, unauthorized users or web spiders may not acquire the required fonts for the above encrypted contents, and may not search for substituting fonts by themselves since the code point encoding scheme is unknown. Therefore, in this aspect, embodiments of the present disclosure achieve the effect of encrypting the electronic document. In addition, fonts are remotely acquired each time the electronic document is to be displayed and, thus, the effect of offline copy protection is also achieved.

In one embodiment, a computer-implemented method for remotely providing fonts for an electronic document is disclosed, which comprises providing at least a first code point encoding scheme and a second code point encoding scheme for a character in the electronic document; selecting from the first code point encoding scheme and the second code point encoding scheme for the character according to a parameter in a request of access in response to the request of access to the electronic document; and providing a first font for the character in response to the request of access if the first code point encoding scheme is selected, wherein the first font is based on the first code point encoding scheme.

In another embodiment, a computer-implemented method for remotely providing fonts for an electronic document is disclosed, which comprises providing at least a first code point encoding scheme and a second code point encoding scheme for a character in the electronic document; selecting from the first code point encoding scheme and the second code point encoding scheme for the character according to a first location of the character in the electronic document in response to a request of access to the electronic document; and providing a first font for the character located at the first location in response to the request of access if the first code point encoding scheme is selected, wherein the first font is based on the first code point encoding scheme.

In another embodiment, a computer-implemented method for remotely providing fonts for an electronic document is disclosed, which comprises providing at least a first code point encoding scheme and a second code point encoding scheme for a character in the electronic document; selecting from the first code point encoding scheme and the second code point encoding scheme for the character according to reference information in response to a request of access to the electronic document; and providing a first font for the character in response to the request of access if the first code point encoding scheme is selected, wherein the first font is based on the first code point encoding scheme.

In another embodiment, a computer system comprising a memory and a processor is provided. The memory stores therein a computer executable command. The processor accesses the memory to execute the computer executable command for performing the aforesaid method.

In another embodiment, a computer program product stored in a computer-accessible medium is provided. The computer program product comprises a computer-readable program executable on a computer system to implement the aforesaid methods.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that embodiments may be practiced without one or more of the specific features or advantages of a particular embodiment. In other instances, additional features and advantages may be recognized in certain embodiments that may not be present in all embodiments.

The following description, the appended claims, and the embodiments described herein further illustrate the features and advantages.

BRIEF DESCRIPTION OF THE DRAWINGS

In order that the advantages will be readily understood, a more particular description of the embodiments briefly described above will be rendered by reference to specific embodiments that are illustrated in the appended drawings. Understanding that these drawings depict only typical embodiments and are not therefore to be considered to be limiting of its scope, the embodiments will be described and explained with additional specificity and detail through the use of the accompanying drawings.

DETAILED DESCRIPTION OF THE EMBODIMENTS

Figure 1:
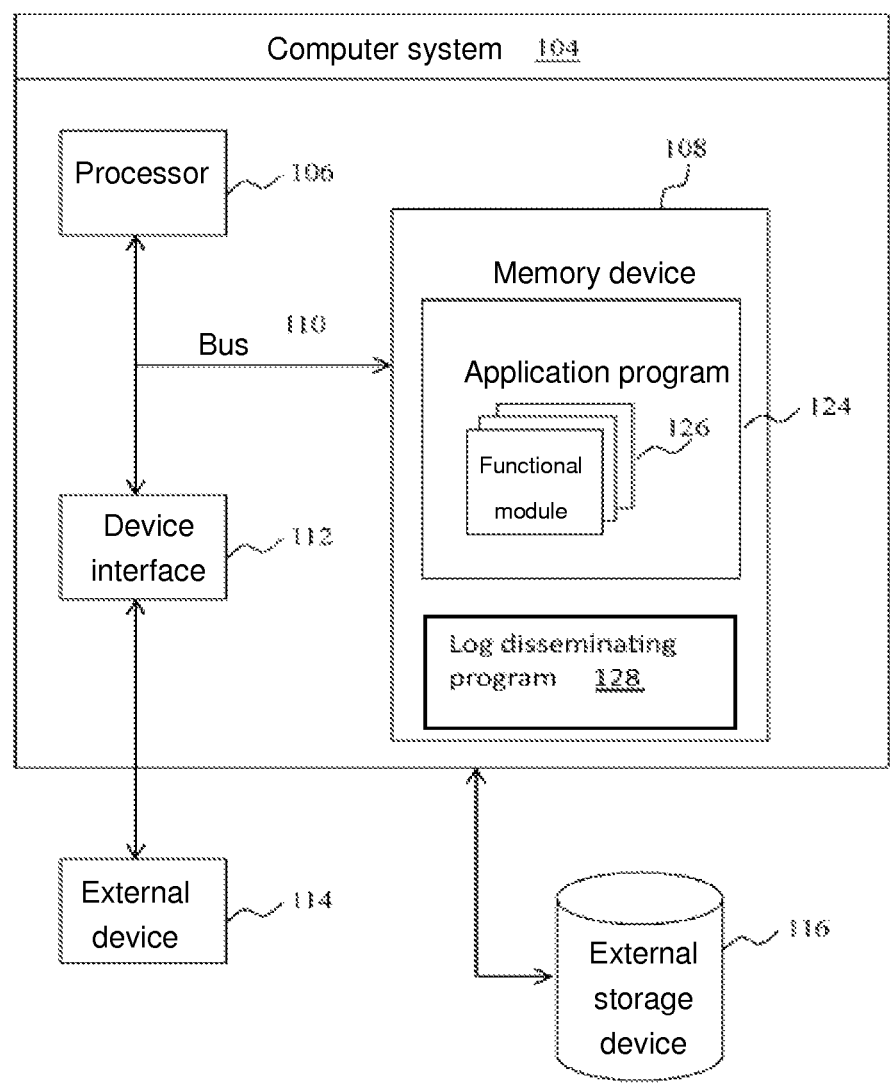
FIG. 1 is a schematic view of a computer system according to one embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

As will be appreciated by one skilled in the art, the present disclosure may be embodied as a computer system/device, a method or a computer program product. Accordingly, embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products. It will be understood that one or more blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, computer systems/devices, methods, and computer program products are illustrated as structural or functional block diagrams or process flowcharts according to various embodiments. The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Framework>

FIG. 1 illustrates the hardware framework of a computer system 104 according to one embodiment. The computer system 104 comprises a processor 106, a memory device 108, a bus 110, and a device interface 112. The processor 106 accesses program code, such as an application program 124 and a log disseminating program 128, in the memory device 108 or an external storage device 116. The application program 124 has one or more functional modules 126 for providing the functions illustrated with FIG. 3 through FIG. 4 and described below. The one or more functional modules 126 are a single instruction or multiple instructions distributed in multiple different program code segments, different programs, and multiple said memory devices 108.

The bus 110 functions as a communication link of various components in the computer system 104. The computer system 104 communicates with an external device 114 via the device interface 112. Furthermore, the computer system 104 communicates with the external device 114, the external storage device 116, or other computer devices/systems via a network. In this regard, the network can also come in the form of any type of connection, including a wide area network (WAN) or a local area network (LAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

In another embodiment, the basic framework and components of the computer system 104 can also come in the form of a typical personal computer or server, such as IBM's System X, Blade Center or eServer.

In one embodiment, the computer system 104 may be implemented as a font management server, yet those skilled in the art should understand that the embodiments described herein are not limited thereto. One example of conventional font management servers is found in U.S. Pat. No. 8,683,006.

Figure 2:
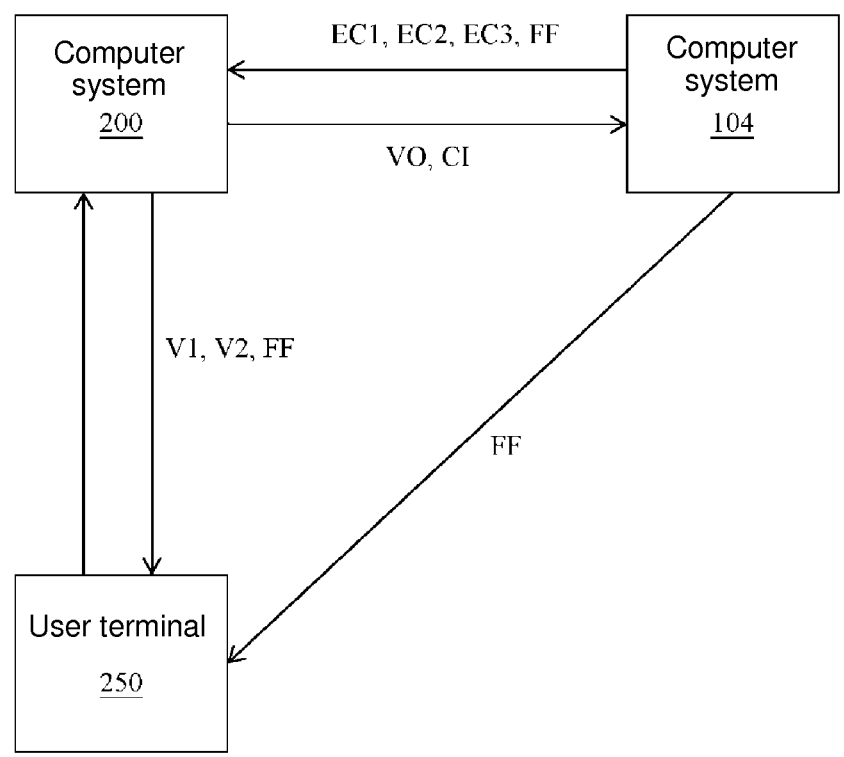
FIG. 2 illustrates a network environment according to one embodiment.

FIG. 2 further shows a network environment of the computer system 104. As shown in FIG. 2, the computer system 104, the computer system 200, and the user terminal 250 communicate with each other by network. In this embodiment, the computer system 200 is implemented as a webpage server, and the computer system 104 in FIG. 1 may provide reference for the basic framework and devices thereof. It also should be mentioned that, although the computer system 104 and the computer system 200 are depicted as independent computer systems in FIG. 2, the computer system 104 and the computer system 200 may also be implemented as different application programs in a single computer system in other embodiments, and they may directly communicate via the operating system or suitable application program interface without requiring network.

The user terminal 250 may be, for example, a personal computer or a mobile phone, and may transmit a HTTP request of access to specific webpages (i.e., a GET request) to the computer system 200 using a web browser.

Figure 3:
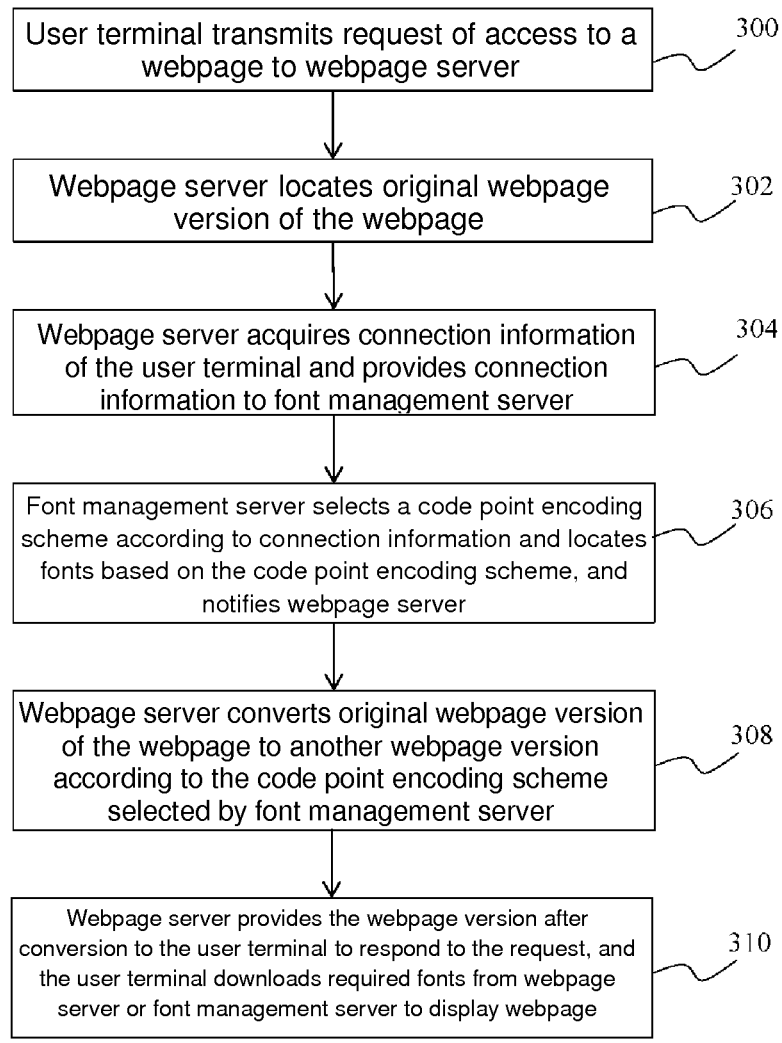
FIG. 3 is a flow chart of a method according to one embodiment.
Figure 4:
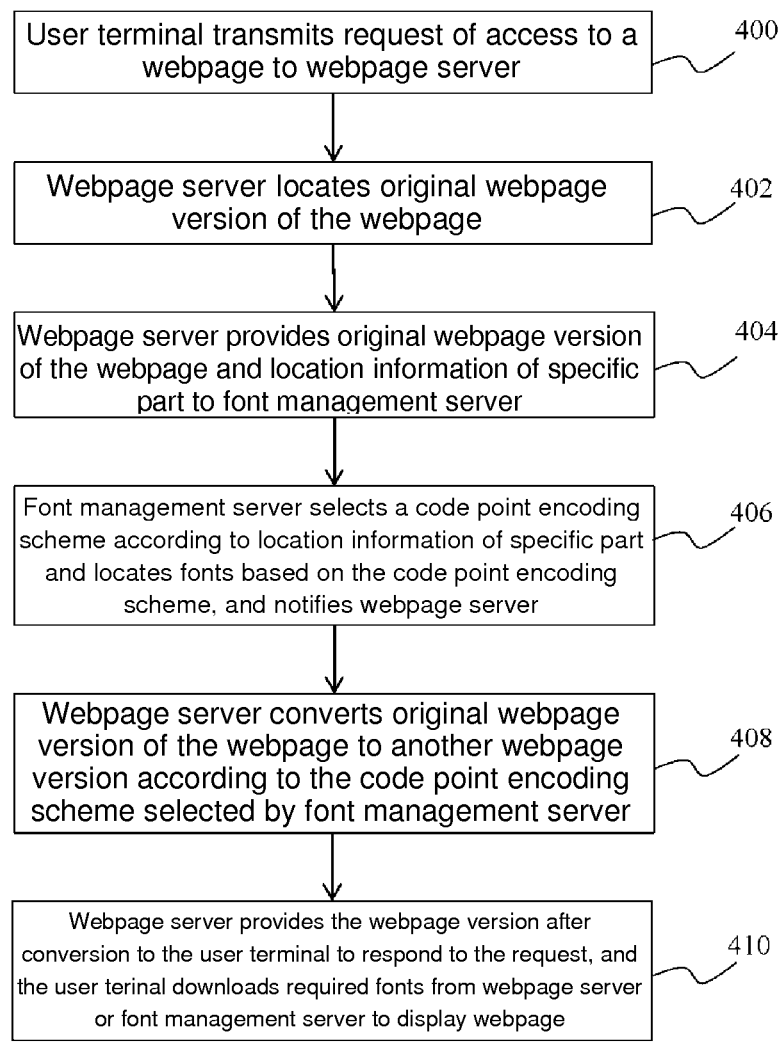
FIG. 4 is a flow chart of a method according to another embodiment.

It should be noted that, in the preliminary operations before the flows in FIG. 3 and FIG. 4 begin, the computer system 104 preliminarily sets extensive code point encoding scheme candidates for each character used in the content of the webpage in its database (not shown), and provides fonts based on the corresponding code point encoding scheme. For example, for the character "A", if the computer system 104 preliminarily sets 10 code point encoding scheme candidates, the computer system 104 also provides 10 types of fonts for the character "A" to correspond to the 10 code point encoding schemes. The 10 types of fonts for the character "A" are at least different in code point encoding, and may be identical or different in glyph. In addition, in some embodiments, the code point encoding scheme candidates are proprietary code point encoding schemes and are confidential, i.e., they are not standard universal code point encoding schemes.

In addition, a HTML webpage is used as an example of the electronic document in the following description, yet it is understood that the embodiments described herein are not limited thereto and may be applied to all circumstances in which the font file may be independent of the electronic document.

<First Embodiment: Encoding Scheme Related to Connection Information>

FIG. 3 shows a flow chart of an exemplary embodiment of a method of remotely providing fonts for an electronic document.

At block 300 the user terminal 250 transmits a HTTP request of access to a specific webpage to the computer system 200 by, for example, uniform resource locator (URL) using a web browser or other electronic document browser programs (both not shown).

At block 302 the computer system 200 receives the request from the user terminal 250, and locates an original webpage version V0 of the webpage requested by the user terminal 250 from a database (not shown) maintained by the computer system 200. It should be noted that, the original webpage version V0 is only for the internal use of the computer system 200 and the computer system 104, and is not directly provided to the user terminal 250; therefore, the code point encoding scheme and the adopted font of the characters in the original webpage version V0 may be determined for purposes of the convenience of editing or subsequent modifications. In general, if the original webpage version V0 is produced by general commercial webpage editor software such as Dreamweaver of Adobe, a standard universal code point encoding scheme such as Unicode is adopted by default, and all fonts based on the standard universal code point encoding scheme may render the original webpage version V0.

At block 304 the computer system 200 may acquire connection information CI of the user terminal 250 via the connection with the user terminal 250, and provide the connection information CI to the computer system 104 serving as the font management server. The connection information CI may comprise one or multiple parameters such as connection time point, user identification information, session identification information, source identification information (such as IP address), device identification information (such as MAC address), or even information of the operating system and web browser used at the user terminal 250. It should be known that the computer system 200 does not have to provide all the above connection information CI to the computer system 104. Optionally, the computer system 200 may save the above information in the form of a log file. Such practices are well known to those skilled in the related art and the details are not described here. In general, the Step 302 and the Step 304 may proceed at the same time.

At block 306 the computer system 104 selects a code point encoding scheme EC1 according to the connection information CI of the user terminal 250 by a predetermined rule such as a look-up table (not shown), and the code point encoding scheme EC1 may be selected from the code point encoding scheme candidates according to correspondence relations in the look-up table. In other words, each selected code point encoding scheme is related to specific connection information CI, and different connection information CI may result in the selection of different code point encoding schemes.

After selecting the code point encoding scheme EC1, the fonts based on the code point encoding scheme EC1 are further located and compressed into a single font file FF. In some embodiments, to prevent the font file FF from being too large, such as for Asian character situations, only the fonts used in the original webpage version V0 are provided. Therefore, in Step 304, the computer system 200 may additionally notify the computer system 104 of the characters used in the original webpage version V0. Subsequently, the computer system 104 notifies the computer system 200 of the selected code point encoding scheme EC1, and directly transmits the font file FF to the computer system 200 or provides download location information of the font file FF to the computer system 200.

At block 308 the computer system 200 converts the original webpage version V0 to a webpage version V1 according to the code point encoding scheme EC1. In one embodiment, the computer system 200 preliminarily stores conversion tables between the original code point encoding scheme of the original webpage version V0 and all the code point encoding scheme candidates, and thus the computer system 104 only has to notify the computer system 200 of the name or code of the selected code point encoding scheme EC1, and the computer system 200 may encode the original webpage version V0 into the webpage version V1 according to the corresponding conversion table.

Table 1 shows an example of the conversion table. In this embodiment, the original webpage version V0 uses Unicode encoding, and thus the numeral character "1" has a code point value of 0031 and the character "B" has a code point value of 0042, for instance. On the other hand, the code point encoding scheme EC1 basically adopts a framework similar to that of Unicode encoding, yet the code point values corresponding to the characters are reassigned, such as changing the code point value of the numeral character "1" to 0041 and changing the code point value of the character "B" to 0032.

TABLE 1

| Character | Unicode encoding (original webpage version V0) | Code point encoding scheme EC1 (webpage version V1) |
| --- | --- | --- |
| 1 | 0031 | 0041 |
| 2 | 0032 | 0042 |
| A | 0041 | 0031 |
| B | 0042 | 0032 |

In another embodiment, if the computer system 200 does not preliminarily store conversion tables as shown in Table 1, the computer system 104 provides the corresponding conversion table to the computer system 200 in this step, so that the computer system 200 may convert the original webpage version V0 to the webpage version V1.

At block 310 the computer system 200 provides the webpage version V1 after conversion to the user terminal 250 to respond to the HTTP request of access to the specific webpage. On the other hand, the computer system 200 also provides download information of the font file FF, i.e., the location of a download server, to the user terminal 250. If the computer system 104 transmitted the font file FF to the computer system 200 in Step 306 in above, the computer system 200 serves as the download server of the font file FF; if the computer system 104 only provided the download location information of the font file FF to the computer system 200, the computer system 200 includes such download location information in the webpage version V1, and the computer system 104 or other computer systems (not shown) may serve as the download server of the font file FF. After the user terminal 250 acquires the font file FF, the fonts based on the code point encoding scheme EC1 may be acquired after decompressing and be stored in a cache (not shown) of the web browser; therefore, the web browser may display the webpage version V1 encoded by the code point encoding scheme EC1 using the fonts based on the code point encoding scheme EC1.

It should be mentioned that, the fonts based on the code point encoding scheme EC1 stored in the cache may be set with an expiration time; after expiring, the user terminal 250 may no longer use the fonts to display the webpage version V1. The user terminal 250 has to re-transmit the HTTP request of access to the same webpage to the computer system 200, i.e., return to the Step 300. Prior art of remotely providing fonts for electronic documents and the CSS2 specification may provide reference for implementations of this part and the details are not described here.

On the other hand, other application programs at the user terminal 250 may not properly display the webpage version V1 encoded by the code point encoding scheme EC1 even if it is acquired (such as by copy and paste) due to the lack of the fonts based on the code point encoding scheme EC1. For example, referring to Table 1 above, the character combination "AB1" has a code point value of 0031 0032 0041 under the code point encoding scheme EC1, and if it is decoded using Unicode which is default in general application programs, an inaccurate character combination of "12A" will be obtained instead of the accurate "AB1".

<Second Embodiment: Encoding Scheme Related to Webpage Content>

FIG. 4 shows a flow chart of another embodiment of a method of remotely providing fonts for an electronic document, where blocks 400 and 402 are similar to the blocks 300 and 302 in FIG. 3 and the details are not repeated here.

At block 404 the computer system 200 provides the original webpage version V0 to the computer system 104. In one embodiment, different parts (such as specific paragraphs or tables) of the original webpage version V0 are subject to different processing, and location information of the specific part in the original webpage version V0 is provided to the computer system 104. For example, html tags in the original webpage version V0 may be used to define the specific paragraph; such a practice is well known to those skilled in the art.

At block 406 the computer system 104 selects a code point encoding scheme according to the location information provided above. For instance, the computer system 104 selects the original encoding (such as Unicode) of the original webpage version V0 for a first paragraph, i.e., the original code point encoding scheme is continued to be used without change; a code point encoding scheme EC2 is selected for a second paragraph; a code point encoding scheme EC3 is selected for paragraphs other than the first paragraph and the second paragraph. In other words, the same character may have different code point values in the first paragraph, the second paragraph, and other parts.

Subsequently, the computer system 104 further locates the fonts based on the code point encoding schemes EC2 and EC3, and compresses into a single font file FF. Optionally, the fonts based on the original encoding (such as Unicode) of the original webpage version V0 may also be included in the single font file FF to be provided. In some instances, only the fonts required for the characters used in the original webpage version V0 have to be provided, and since the computer system 104 may acquire the original webpage version V0 for analysis, the computer system 200 does not have to additionally notify the computer system 104 of the characters used in the original webpage version V0. Subsequently, the computer system 104 notifies the computer system 200 of the code point encoding schemes selected for each paragraph of the original webpage version V0, and directly transmits the font file FF to the computer system 200 or provides download location information of the font file FF to the computer system 200.

At block 408 the computer system 200 converts the original webpage version V0 to a webpage version V2 according to the code point encoding schemes notified by the computer system 104. In this embodiment, since the first paragraph of the webpage version V2 continues to use the original encoding, no conversion is actually needed; therefore, the computer system 200 only has to convert the second paragraph according to the code point encoding scheme EC2 and convert the parts other than the first paragraph and the second paragraph according to the code point encoding scheme EC3.

At block 410 the computer system 200 provides the webpage version V2 after conversion to the user terminal 250 to respond to the HTTP request of access to the specific webpage., the computer system 200 also provides download information of the font file FF, i.e., the location of a download server, to the user terminal 250. In this embodiment, due to the mixed usage of multiple proprietary code point encoding schemes (the code point encoding scheme EC2 and the code point encoding scheme EC3), the difficulty of cracking the encoding scheme is substantially increased. On the other hand, the embodiment also allows the first paragraph of the webpage version V2 to use the standard universal code point encoding scheme (i.e., Unicode), and such a practice may be applied for content introduction parts that do not require encryption or copy protection, and web spiders, such as search engines, may be allowed to access the content of the first paragraph and add to the website index to attract more visitors.

It is worthy to mention that the embodiments in FIG. 3 and FIG. 4 are not mutually exclusive, and the two may be combined in practice; particularly, the computer system 104 may select one or multiple code point encoding schemes according to the connection information of the user terminal 250 and the content of original webpage version V0 collectively.

In addition, the computer system 104 may also select the code point encoding scheme according to other reference information, which may be entirely irrelevant to the connection information of the user terminal 250 and the content of original webpage version V0. The reference information may be, for example, a present time of the computer system 104, information provided by the computer system 200 (such as visitor count of the webpage server), or a condition inputted by a manager of the computer system 104, and is not restricted by the invention.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A computer-implemented method for remotely providing fonts for an electronic document, the method comprising:
   receiving a request to access an electronic document from a local user terminal;
   locating an original version of the electronic document from a remote server;
   selecting a set of one or more code point encoding schemes for the electronic document from a plurality of code point encoding schemes;
   reassigning the set of one or more code point encoding schemes in the electronic document into a connection code point encoding scheme based on one or more connection information parameters in the request to access the electronic document and based on character location information in the electronic document, such that moving text to a second document displays characters as different characters;
   converting, based on the reassigning connection code point encoding scheme, the original version of the electronic document to a second version of the electronic document; and
   providing the second version of the electronic document to the local user terminal.

2. The method of claim 1, further comprising:
   acquiring connection information of the local user terminal.

3. The method of claim 2, wherein the connection information comprises one or more of connection time point, user identification information, session identification information, source identification information, device identification information, operating system at the local user terminal or web browser at the local user terminal.

4. The method of claim 1, wherein the selecting further comprises selecting the individual code point encoding scheme based on a first location of a first character in the electronic document, and
   wherein the converting further comprises providing a first font for the first character at the first location based on the selected code point encoding scheme.

5. The method of claim 4 further comprising:
   wherein the selected individual code point encoding scheme is a first code point encoding scheme;
   selecting a second code point encoding scheme from the plurality of code point encoding schemes based on a second location of the first character in the electronic document; and
   wherein the converting comprises providing a second font for the first character at the second location based on the second code point encoding scheme.

6. The method of claim 5, wherein the first code point encoding scheme is a proprietary code point encoding scheme, and the second code point encoding scheme is a standard universal code point encoding scheme.

7. The method of claim 1, wherein the identification information parameter is a transmission control protocol/internet protocol address.

8. The method of claim 1, wherein a code point value for a first character in the reassigned code point encoding scheme is different than the code point value for the first character in Unicode and the same as the code point value of a second character in Unicode.

9. A computer system, comprising:
   a device interface configured to receive a request to access an electronic document from a local user terminal;

a memory device; and a processor communicatively coupled to the device interface and the memory device, wherein the processor is configured to obtain a first version of the electronic document, from a remote server, in response to the request received via the device interface from the local user terminal to access the electronic document, wherein the processor is further configured to select a set of one or more code point encoding schemes for in the electronic document from a plurality of code point encoding schemes, to reassign the set of one or more code point encoding schemes in the electronic document into a connection code point encoding scheme based on one or more connection information parameters in the request to access the electronic document and based on character location information in the electronic document, such that moving text to a second document displays characters as different characters;

to convert, based on the reassigned connection code point encoding schemes, first version of the electronic document to a second version of the electronic document, and wherein the processor is further configured to transmit the second version of the electronic document to the local user terminal via the device interface.

10. The system of claim 9, wherein the processor is further configured to acquire connection information of the local user terminal, and wherein the identification information parameter related to the request to access the electronic document comprises connection information.

11. The system of claim 10, wherein the connection information comprises one or more of connection time point, user identification information, session identification information, source identification information, device identification information, operating system at the local user terminal or web browser at the local user terminal.

12. The system of claim 9, wherein the processor is configured to select the individual code point encoding scheme based on a first location of a first character in the electronic document and to convert the first version of the electronic document to the second version based on a first font for the first character at the first location based on the selected code point encoding scheme.

13. The system of claim 12, wherein the selected individual code point encoding scheme is a first code point encoding scheme, wherein the processor is further configured to select a second code point encoding scheme from the plurality of code point encoding schemes based on a second location of the first character in the electronic document, and wherein the processor is configured to provide a second font for the first character at the second location based on the second code point encoding scheme to convert the first version of the electronic document to a second version.

14. The system of claim 13, wherein the first code point encoding scheme is a proprietary code point encoding scheme, and the second code point encoding scheme is a standard universal code point encoding scheme.

15. A program product comprising a non-transitory computer-readable storage medium having program instructions embodied thereon, wherein the program instructions are configured, when executed by a computer system, to cause the computer system to:

obtain an original version of an electronic document, from a remote server, in response to a request from a local user terminal to access the electronic document;

select a set of one or more code point encoding schemes for the electronic document from a plurality of code point encoding schemes;

reassign the set of one or more code point encoding schemes in the electronic document into a connection code point encoding scheme based on one or more connection information parameters in the request to access the electronic document and based on character location information in the electronic document, such that moving text to a second document displays characters as different characters;

convert based on the reassigned connection code point encoding scheme, the original version of the electronic document to a second version of the electronic document; and transmit the second version of the electronic document to the local user terminal.

16. The program product of claim 15, wherein the program instructions are further configured to cause the computer system to acquire connection information of the local user terminal.

17. The program product of claim 16, wherein the connection information comprises one or more of connection time point, user identification information, session identification information, source identification information, device identification information, operating system at the local user terminal or web browser at the local user terminal.

18. The program product of claim 15, wherein the program instructions are further configured to cause the computer system to select the individual code point encoding scheme based on a first location of a first character in the electronic document, and to provide a first font for the first character at the first location based on the selected code point encoding scheme.

19. The program product of claim 18, wherein the selected individual code point encoding scheme is a first code point encoding scheme, and wherein the program instructions are further configured to cause the computer system to select a second code point encoding scheme from the plurality of code point encoding schemes based on a second location of the first character in the electronic document, and to provide a second font for the first character at the second location based on the second code point encoding scheme.

20. The program product of claim 19, wherein the first code point encoding scheme is a proprietary code point encoding scheme, and the second code point encoding scheme is a standard universal code point encoding scheme.

* * * * *